Figure 1:
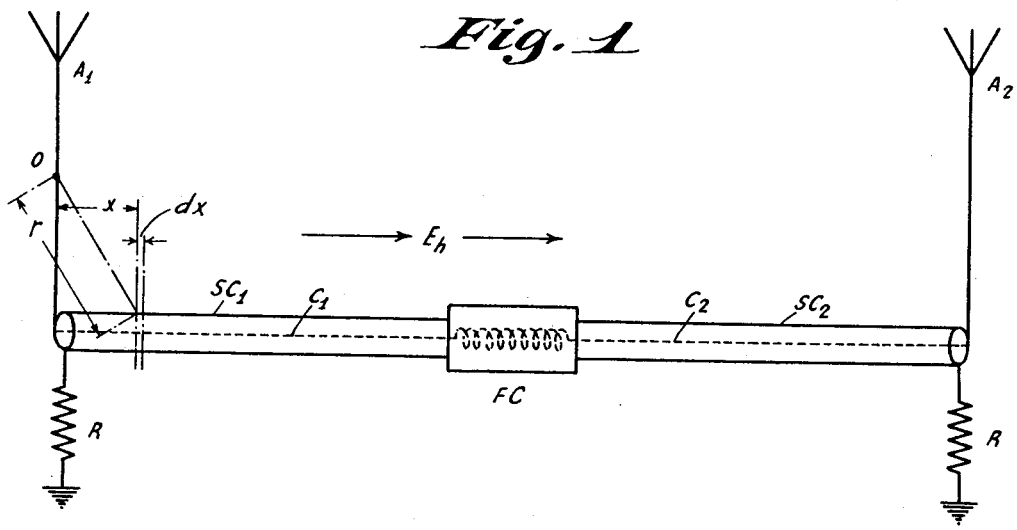

May 23, 1933.  T. L. ECKERSLEY  1,909,937

RADIO DIRECTION FINDER

Filed June 6, 1931

INVENTOR
THOMAS LYDWELL ECKERSLEY

BY *H. S. Grover*

ATTORNEY

Patented May 23, 1933

1,909,937

UNITED STATES PATENT OFFICE

THOMAS LYDWELL ECKERSLEY, OF WEATHEROAK, DANBURY, ENGLAND, ASSIGNOR TO RADIO CORPORATION OF AMERICA, A CORPORATION OF DELAWARE

RADIO DIRECTION FINDER

Application filed June 6, 1931, Serial No. 542,497, and in Great Britain July 25, 1930.

This invention relates to direction finding apparatus and more particularly to direction finding apparatus for use on very short waves, for example, waves of the order of 100 meters, or less.

The invention is for an improvement in or modification of the invention set forth in the specification accompanying my copending application, Serial No. 532,726, filed April 25, 1931.

One of the difficulties met with in short wave direction finding is that due to the effect generally known as "night effect" which results in apparent variation in received intensity which makes accurate directional observation difficult and in some cases even impossible. Where a direction finding installation includes horizontal members, it has been attempted to avoid "night effect" by continuously screening these members, which may be, for example, horizontal feeders leading to spaced aerials.

The parent specification describes various arrangements of shielded systems for avoiding "night effect", and although such systems substantially reduce "night effect" it has now been found that such effect still persists to an undesirable extent. Despite the fact that in systems as described in the parent specification substantially complete shielding is provided for the horizontal members, the effect of the horizontally polarized field which is responsible for "night" errors is not entirely eliminated since the said horizontal field sets up currents and voltages in the outer sheath of the feeder which currents and voltages are inductively transferred to the vertical aerials and thus introduce secondary errors due to the horizontal wave polarization. Experiment and calculations indicate that this secondary effect is due to the accumulation of a free charge on the feeders, i. e., on the horizontal members.

The principal object of the present invention is to eliminate or substantially reduce such secondary effects and to this end means are provided for substantially eliminating the accumulation of a free charge.

According to this invention, a feeder or equivalent horizontal or approximately horizontal member, of a directional aerial system (the term "horizontal" or "approximately horizontal member" as here used, is intended to include all those leads, feeders, connections, and so forth, which form part of the aerial system but which are not intended to receive radiation and are therefore screened) is earthed at its extreme ends through impedances each equal to the surge impedance of the earth feeder system considered as a cable. Alternatively, the feeder is extended at each end by a distance large compared with the attenuation distance of the feeder and is then earthed at the extended ends through the surge impedances.

Figure 2:
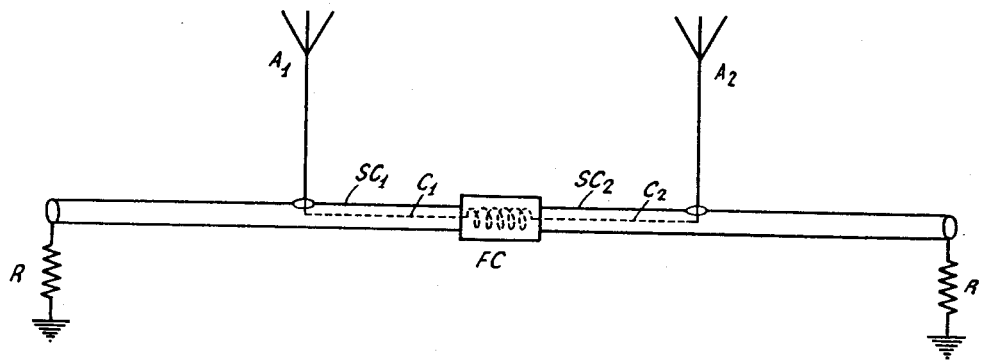

The invention is illustrated in the accompanying diagrammatic drawing in which Figure 1 shows a portion of an installation as described in the parent specification modified in accordance with the present invention. In the accompanying Figure 1 like references are used to those in the drawing accompanying the parent specification, the additional references in the said accompanying Figure 1 indicating certain quantities referred to in the appended mathematical explanation. Figure 2 shows a modification of the arrangement shown in Figure 1.

Referring to Figure 1, a directional receiving system includes a pair of vertical aerials $A_1$ and $A_2$ which are connected together by a horizontal feeder $C_1 C_2$ at the midpoint of which is arranged a goniometer unit FC. The whole length of the feeder and the goniometer unit is continuously screened by screen $SC_1$, $SC_2$, as also is the apparatus associated with the said goniometer unit so that the installation as so far described is similar to that described in the specification accompanying my co-pending application, Serial No. 532,-726, filed Aprl 25, 1931. The extreme ends of the screened feeder are earthed each through an impedance R equal to the surge impedance of the earth feeder system considered as a cable. The effect of this is to make the feeder equivalent (if perfect balance is obtained) to an infinitely extended feeder so that there can be no accumulation of charge thereon, and there will accordingly be no secondary electro-motive force induced in the vertical aerials consequent upon voltages and currents caused in the outer sheath of the feeder due to horizontally polarized fields. Owing to the fact, however, that it is not an easy matter to obtain perfect balance, it is preferred to extend the feeder (as shown in Figure 2) at either end to a distance which is large as compared with the attenuation length of the said feeder, and to earth the extended feeder at both ends through impedances equal to the surge impedances. Any unbalance which may then exist would be confined to the region near the earth points and by making these points remote, the effect of such unbalance may be made negligible. It should be noted that the attenuation distance may be made small by placing the feeder close to the earth.

In order that the operation of the arrangement shown in the drawing may be the better understood, the following mathematical explanation is provided. It is to be understood that the invention is not dependent upon the accuracy or otherwise of the said mathematical explanation, though this is believed to be correct and sufficiently accurate for all practical purposes.

Let the current in the screen $SC_1$ at any point having mutually perpendicular coordinates $x$ $y$ $z$ measured from the foot of the aerial $A_1$ be equal to $i_x$ $i_y$ $i_z$. Let Q be the charge density upon the screen. Then it is possible from the scalar potential due to the charge Q to calculate the electric forces at any point O say on the aerial $A_1$. The electric forces at the point considered will have components in the following three directions (1) horizontal in the direction of the screen (2) horizontal in the direction of the screen but perpendicular to the direction (1), and (3) vertical. Let these three components be X, Y, and Z respectively, then $$X = -i_o \frac{d}{dt} \int \frac{(i_x)}{r} + \frac{d}{dx} \int \frac{(Q)}{r}$$

$$Y = -i_o \frac{d}{dt} \int \frac{(i_y)}{r} + \frac{d}{dy} \int \frac{(Q)}{r}$$

$$Z = -i_o \frac{d}{dt} \int \frac{(i_z)}{r} + \frac{d}{dz} \int \frac{(Q)}{r}$$

In the above expressions the values of current $i_x$, $i_y$, $i_z$, and the value of charge, Q, are the quantities taken at the time $t = \frac{r}{c}$ and of course the integrals should be taken between the limits corresponding to the regions at which the currents $i$ and charge Q exist. The only one of these three components of electrical forces to be considered is the last one, namely, that in the vertical direction. Now since the current in the screen is everywhere horizontal, changing values of screen current can only produce a horizontal electro-motive force which does not affect the vertical aerial, and it will be seen that the secondary effect of screen currents will depend upon the second term of the above expression for the vertical component of electrical force, namely, on the expression $$\frac{d}{dz} \int \frac{(Q)}{r}$$

From this it follows that if the charge on the shield can be reduced to zero everywhere, the secondary effect should vanish.

If the horizontal shield is extended to infinity in both directions, a uniform horizontal electro-motive force of the form $E \sin p t$ will produce a uniform periodic current. Now since $$\frac{dQ}{dt} = jpQ = \frac{di}{dx}$$

and since moreover, the value $i$ is not a function of $x$, $jpQ = 0$ and $Q = 0$ everywhere. There will therefore be no secondary electromotive force induced in the aerials. The horizontal feeder earthed at its ends by the surge impedances is, of course, equivalent to an infinitely extended feeder. Hence, it follows that the above described system will produce no secondary electro-motive force on the aerials $A_1$ and $A_2$ due to currents induced by the horizontal electro-motive force $E_h$ (that of the received field).

Having thus described my invention and the operation thereof, what I claim is:

1. A directional aerial system comprising, a pair of spaced vertical conductors, a horizontal conductor connecting said vertical conductors, a metallic shield completely enclosing said horizontal conductor to prevent transfer of energy between said horizontal conductor and said vertical conductors, and means for preventing standing waves being developed along said shield comprising an impedance connecting each end of the shield to ground.

2. A system as recited in claim 1 in which each impedance is equal to the surge impedance of the shield when acting as a horizontal conductor.

3. A directional aerial system comprising, a pair of spaced vertical conductors, a horizontal conductor connecting the lower terminals of said spaced vertical conductors, a metallic shield enclosing said horizontal conductor said shield having openings to permit connection of the vertical conductors to the terminals of the horizontal conductor, said shield extending an appreciable distance beyond said horizontal conductor at each end, and an impedance connecting each end of said shield to ground.

4. An arrangement as claimed in claim 3 in which each of said impedances is equal to the surge impedance of the shield when acting as a horizontal conductor.

THOMAS LYDWELL ECKERSLEY.